(12) United States Patent
Signorelli et al.

(10) Patent No.: US 11,657,073 B2
(45) Date of Patent: May 23, 2023

(54) SYSTEM AND APPARATUS FOR RATING ACCESSIBILITY FOR USERS WITH ACCESSIBILITY NEEDS

(71) Applicants: Sharol A. Signorelli, Ridgefield, CT (US); Steven Joseph Signorelli, Jr., Ridgefield, CT (US)

(72) Inventors: Sharol A. Signorelli, Ridgefield, CT (US); Steven Joseph Signorelli, Jr., Ridgefield, CT (US)

(73) Assignee: THE FUNABILITIES COMPANY, Ridgefield, CT (US)

( * ) Notice: Subject to any disclaimer, the term of this patent is extended or adjusted under 35 U.S.C. 154(b) by 309 days.

(21) Appl. No.: 16/708,365

(22) Filed: Dec. 9, 2019

(65) Prior Publication Data
US 2020/0183957 A1 Jun. 11, 2020

Related U.S. Application Data

(60) Provisional application No. 62/776,714, filed on Dec. 7, 2018.

(51) Int. Cl.
*G06F 16/00* (2019.01)
*G06F 16/29* (2019.01)
*G06Q 90/00* (2006.01)

(52) U.S. Cl.
CPC ............. *G06F 16/29* (2019.01); *G06Q 90/20* (2013.01)

(58) Field of Classification Search
CPC ................................ G06F 16/29; G06Q 90/20
See application file for complete search history.

(56) References Cited

U.S. PATENT DOCUMENTS

| | | | |
|---|---|---|---|
| 2009/0037211 A1* | 2/2009 | McGill | H04L 51/34 705/319 |
| 2013/0205257 A1* | 8/2013 | Albright | G01C 21/206 715/810 |
| 2018/0174112 A1* | 6/2018 | Breedvelt-Schouten | G06Q 50/01 |
| 2020/0003569 A1* | 1/2020 | Polanowski | G01C 21/3697 |

* cited by examiner

*Primary Examiner* — Dinku W Gebresenbet
(74) *Attorney, Agent, or Firm* — Murtha Cullina LLP

(57) ABSTRACT

A system and apparatus for rating accessibility of a number of locations for user and/or members with specific accessibility needs. The user and/or member interacts with a database through his or her communication device or through a website to access locations in a geographic zone that provide accommodations for people with specific accessibility needs in a variety of accessibility categories. The system provides detailed accessibility features within each accessibility category and rates the locations according to the accessibility categories. The member can also input new locations, rate locations already contained in the database, or provide other feedback regarding compliance with legal accessibility guidelines and/or other accessibility standards within the United States and abroad. The system updates the ratings of the accessibility categories and the accessibility features based on input from members.

20 Claims, 13 Drawing Sheets

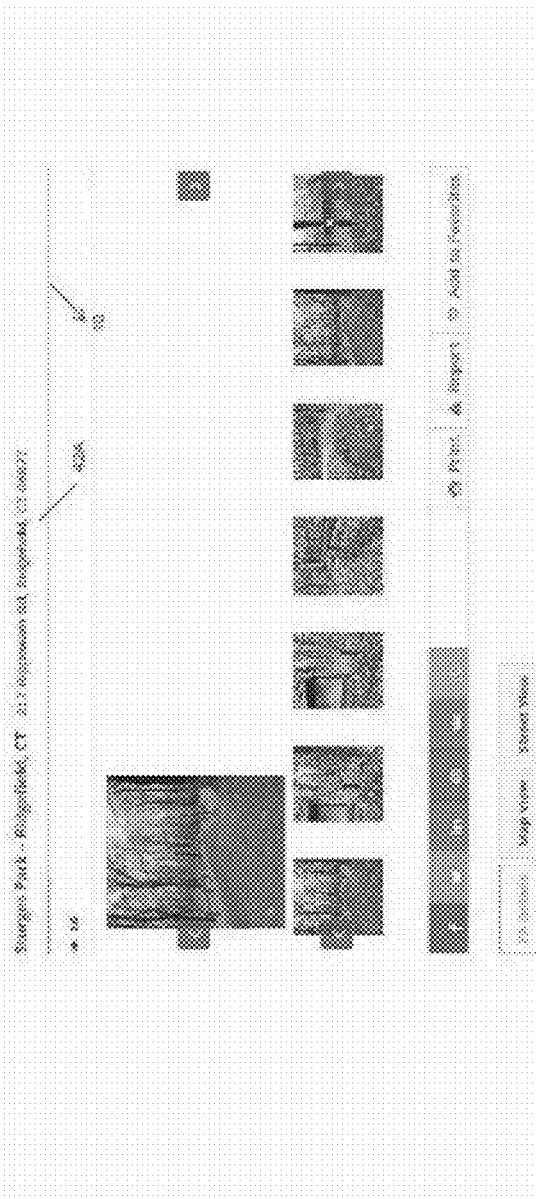

This park offers limited accessibility, but what it does offer is meaningful. The campsite is fairly flat and there is a new building for campers and access needs. If the gate is locked, which it is most of the time, vehicles must park at the bottom of the hill to the campground. This makes it inaccessible unless you or caregiver has herculean strength to push or pull you up the steep gravel pathway. As noted on the website:

- Must unlock and lock parking gate for limited parking (no parking in road).
- Key needed to unlock gate-email us to obtain key ($10 refundable key deposit). Email is recfacilities@ridgefieldct.org.

Search

How

☐ with Wheels —— 20A

☐ with Mobility Aids —— 20B

☐ with Sensory Sensitivity —— 20 C

FIG. 2A

SYSTEM AND APPARATUS FOR RATING ACCESSIBILITY FOR USERS WITH ACCESSIBILITY NEEDS

TECHNICAL FIELD

The present invention is directed a system and an apparatus that provides users and/or members with information regarding specific accessibility needs at a number of locations, Specifically, the system and apparatus provides a user and/or member with in-depth information regarding a variety of accessibility categories and detailed accessibility features within the categories for numerous locations within a geographic zone selected by the user and/or member.

BACKGROUND

Individuals with accessibility needs have specific requirements that must be present when traveling to various locations outside of their homes. Often people with accessibility needs do not and/or are unable to participate in visits to places, services, or events because they cannot guarantee that their accessibility needs will be accommodated by the locations. As a result, leaving home creates a variety of anxieties often resulting in the individual with accessibility needs choosing to stay home. This creates significant hardship on the individual with the accessibility needs and on the people that love, live with, and/or care for the individual. These hardships present themselves in the individuals and their caregivers as isolation, boredom, frustration, depression, sadness, or other unwanted feelings.

Individuals with accessibility needs staying home also negatively impacts the surrounding community, because the people with accessibility needs do not get to fully cohabitate within their community. Communities suffer by missing out on integrative opportunities and participation, which ultimately make the community a better place for everyone to live.

The Americans with Disabilities Act ("ADA"), a civil rights law, is over 29 years old, but communities throughout the United States of America are still woefully behind in removing barriers for participation. The ADA is a complaint-driven law and there is no user-friendly and easy to interpret tool for businesses to use to understand what the ADA standards are and how to provide better accessibility to those in need in an affordable and meaningful way. If consumers know that a business has an accessible bathroom, then it is likely the consumer with that specific accessibility need will choose to visit that business. If other businesses in a similar field and/or location see the business they are losing, there is value in investing to modify their bathroom to be compliant with the ADA. The value for the business owner is that the location having specific accessibility features that accommodates individuals having specific accessibility needs results in more business from the individuals having the specific accessibility needs and anyone associated with and/or travelling with that individual. The value is in the reward obtain: more business.

There exists a need in the art for a system and apparatus for providing users with information regarding the accessibility options present at a number of locations and for providing businesses with a way to communicate with users the accessibility options the business offers.

SUMMARY

There is disclosed herein a method of providing a member with accessibility information. The method includes determining a geographic zone based on a geographic location of the member and/or a selected geographic location. A user communication device communicates the geographic location of the member. The member inputs a geographic zone identifier to establish the selected geographic location. The method includes establishing a member needs profile based on the member inputting one or more accessibility categories and/or one or more accessibility features in a format compatible with the user communication device. The method includes retrieving a list of locations within the geographic zone from a database for each accessibility category and accessibility feature in the member needs profile. The method includes retrieving a category accessibility rating for each accessibility category from the database for each of the list of the locations, retrieving an overall accessibility rating for each of the list of the locations from the database based on the category accessibility rating for each accessibility category stored therein, and/or retrieving a list of the accessibility features of each of the list of the locations. The category accessibility rating for each accessibility category is based on a weighted algorithm of accessibility features for each of the list of the locations from the database. The method also includes displaying each of the list of the locations with the category accessibility rating for each accessibility category, the overall accessibility rating, and/or the accessibility features on a screen contained in the user communication device in an order based on the geographic zone and/or the member needs profile. The accessibility categories are with Wheels, with Mobility Aid, with Sensory Sensitivity, with Cognitive Support, with Vision Support, with Hearing Support, with Medical Support, and with Short Stature.

In one embodiment, the method includes receiving a second input from the member through the user communication device of one or more accessibility categories and/or one or more accessibility features after the step of displaying each of the locations to establish a modified search result. The method also includes displaying each of the locations on the screen of the user communication device in an updated order based on the geographic zone and/or the modified search result.

In one embodiment, the accessibility features include safety features, dignity features, or comfort features. The category accessibility rating weighs safety features heavier than dignity features and weighs dignity features heavier than comfort features.

In one embodiment, the safety features include but are not limited to bathroom accessibility, entrance accessibility, parking accessibility, seating accessibility, bathroom amenities being accessible or lowered, sinks being accessible or lowered, tables and counters being accessible or lowered, providing an adequate bathroom turning radius, braille availability, providing a braille keypad or a phone with large buttons, adequate circulation paths, clear boundaries, providing a defibrillator, providing an elevator, providing an entrance landing, providing an evacuation chair or other evacuation means, posting an evacuation plan, providing a family or companion care bathroom, providing a fire alarm with a strobe light and sound, providing grab bars, providing a door handle inside a bathroom stall, providing a lifeguard, providing a lowered toilet, providing medically trained personnel, providing a nearby medical center, providing parking close to an entrance, providing adequate lighting for parking and an entrance, providing a platform lift, providing a hoist for a pool or hot tub, providing public outlets for charging, providing a ramp, sanitary excellence, providing secure boundaries, forbidding smoking, providing a stair lift, providing handrails for stairs, providing step stools, providing tactile markers, providing a TTY or TDD telephone, protection from under sink pipes, and/or providing van parking.

In one embodiment, the dignity features include but are not limited to providing accessible or lowered self-serve areas, providing an adult changing table and area, providing augmentative communication, providing a bathroom occupancy signal, providing calm sounds and quiet areas, providing closed captioning, providing an easy open door, providing entrance directional signage, large print availability, providing lowered light switches, providing a predictable environment, providing staff trained with the Americans with Disabilities Act ("ADA") sensitivities, and/or being support animal friendly.

In one embodiment, the comfort features include but are not limited to accommodating staff, providing an automated door, providing automatic sink faucets, booth seating arrangements, providing a communication system, companion seating arrangements, providing concessions and/or vending machines, providing a hearing amplifier, providing hooks, providing shelves, providing baskets, providing lever-style door handles, low odors, the location being one level or a single story, sign language, providing soft surfaces, and/or providing soft and consistent lighting.

In one embodiment, the database is accessed by the user communication device through the Internet and the format compatible with the user communication device is a website or an application that communicates with the database through the Internet.

In one embodiment, the method also includes receiving a chosen one of the locations from the user communication device after displaying each of the locations and providing directions on the screen of the user communication device from the geographic location of the member to the chosen one of the locations.

In one embodiment, the method also includes receiving a chosen one of the locations from the user communication device after displaying each of the locations and storing the chosen one of the locations in the user communication device as a favorite location.

In one embodiment, the method also includes receiving a member rating in the form of at least one of a rating of one or more accessibility categories and the presence of one or more accessibility features for one of the locations. The method includes incorporating the one or more accessibility features into the accessibility features of the one location.

In one embodiment, the method assigns the member a voting power based on a total number of accessibility features included in the member rating within the accessibility category and/or the total number of accessibility categories evaluated by the member.

In one embodiment, the category accessibility rating and/or the overall accessibility rating of the one location remains the same if the rating equals zero.

In one embodiment, the member needs profile also includes a location identifier designating a place, a service, an event, a type of place, a type of service, or a type of event.

There is also disclosed herein a member accessibility needs profile. The member accessibility needs profile includes an accessibility category and/or an accessibility feature selected by the member. A geographic zone is selected by the member. The geographic zone is selected with each new search. The geographic zone is an area surrounding a current geographic location of the member or a future geographic location of the member. The member accessibility needs profile evaluates a database of a number of locations and displays a list of the locations in an order based on the accessibility category and/or the accessibility feature selected by the member and displays a category accessibility rating for each of the accessibility categories, a list of one or more accessibility features, and an overall accessibility rating based on the category accessibility rating for the locations. The category accessibility rating is based on a weighted algorithm of the presence of accessibility features for each of the locations.

In one embodiment of the member accessibility needs profile, the member is able to view the overall accessibility rating for each of the locations, to view the category accessibility rating for each the locations, to provide the accessibility features and rate the accessibility categories for the locations for storage in the database, to participate in groups and forums, to send messages to other members, to add comments, and to add a new location to the locations in the database.

In one embodiment of the member accessibility needs profile, a number of members provide the accessibility features of each accessibility category that modifies the category accessibility rating for one of the locations.

There is also disclosed herein a method of providing a member with accessibility, information. The method includes determining a geographic zone based on a geographic location of the member and/or a selected geographic location. A user communication device communicates the geographic location of the member. The member inputs a geographic zone identifier to establish the selected geographic location. The method includes establishing a member needs profile based on the member inputting an accessibility category and/or an accessibility feature in a format compatible with the user communication device. The method includes retrieving a list of locations within the geographic zone from a database for each accessibility category and accessibility feature in the member needs profile. The method includes retrieving a category accessibility rating for each accessibility category from the database for each of the list of the locations and/or retrieving an overall accessibility rating for each of the list of the locations from the database based on the category accessibility rating for each accessibility category stored therein. The category accessibility rating for each accessibility category is based on a weighted algorithm of accessibility features for each of the list of the locations from the database. The method includes displaying each of the list of the locations with at least one of the category accessibility rating for each accessibility category, the overall accessibility rating, and a list of the accessibility features on a screen contained in the user communication device in an order based on the geographic zone and/or the member needs profile. The method includes receiving a member rating in the form of a rating of the accessibility category and/or a presence of the accessibility feature for one of the locations. The method includes incorporating the presence of the accessibility feature into the accessibility features for one of the locations. The accessibility categories include with Wheels, with Mobility Aid, with Sensory Sensitivity, with Cognitive Support, with Vision Support, with Hearing Support, with Medical Support, and with Short Stature. The method assigns the member a voting power based on a total number of accessibility features included in the member rating within the accessibility category and/or the total number of accessibility categories evaluated by the member.

BRIEF DESCRIPTION OF THE DRAWINGS

FIG. 2A depicts the upper portion of the details of one location provided by the system of FIG. 1;

DETAILED DESCRIPTION

Figure 1:
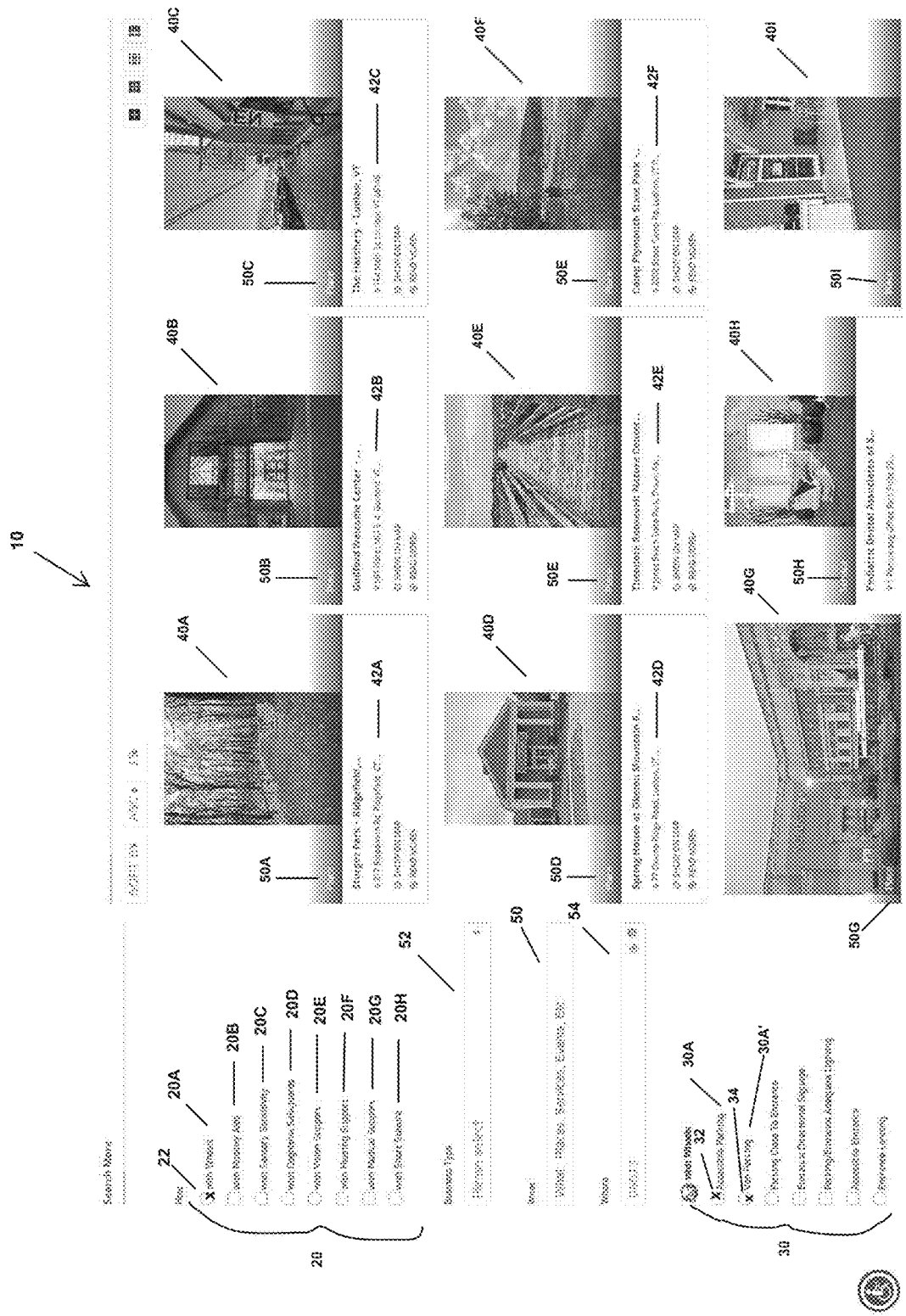
FIG. 1 depicts a system for rating accessibility for users and/or members with accessibility needs according to the present disclosure.
Figure 2B:
FIG. 2B depicts the lower portion of the details of the location of FIG. 2A.
Figure 3:
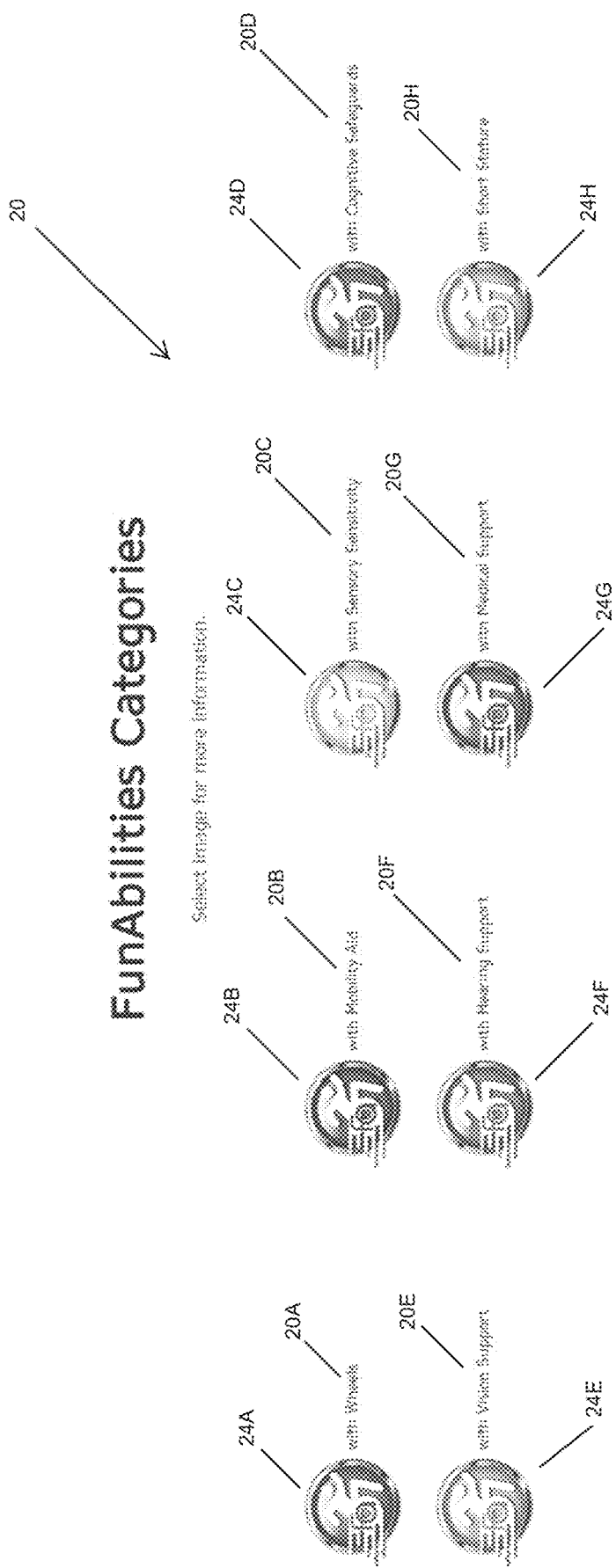
FIG. 3 depicts certifications for the accessibility categories incorporated into the system of FIG. 1.
Figure 4:
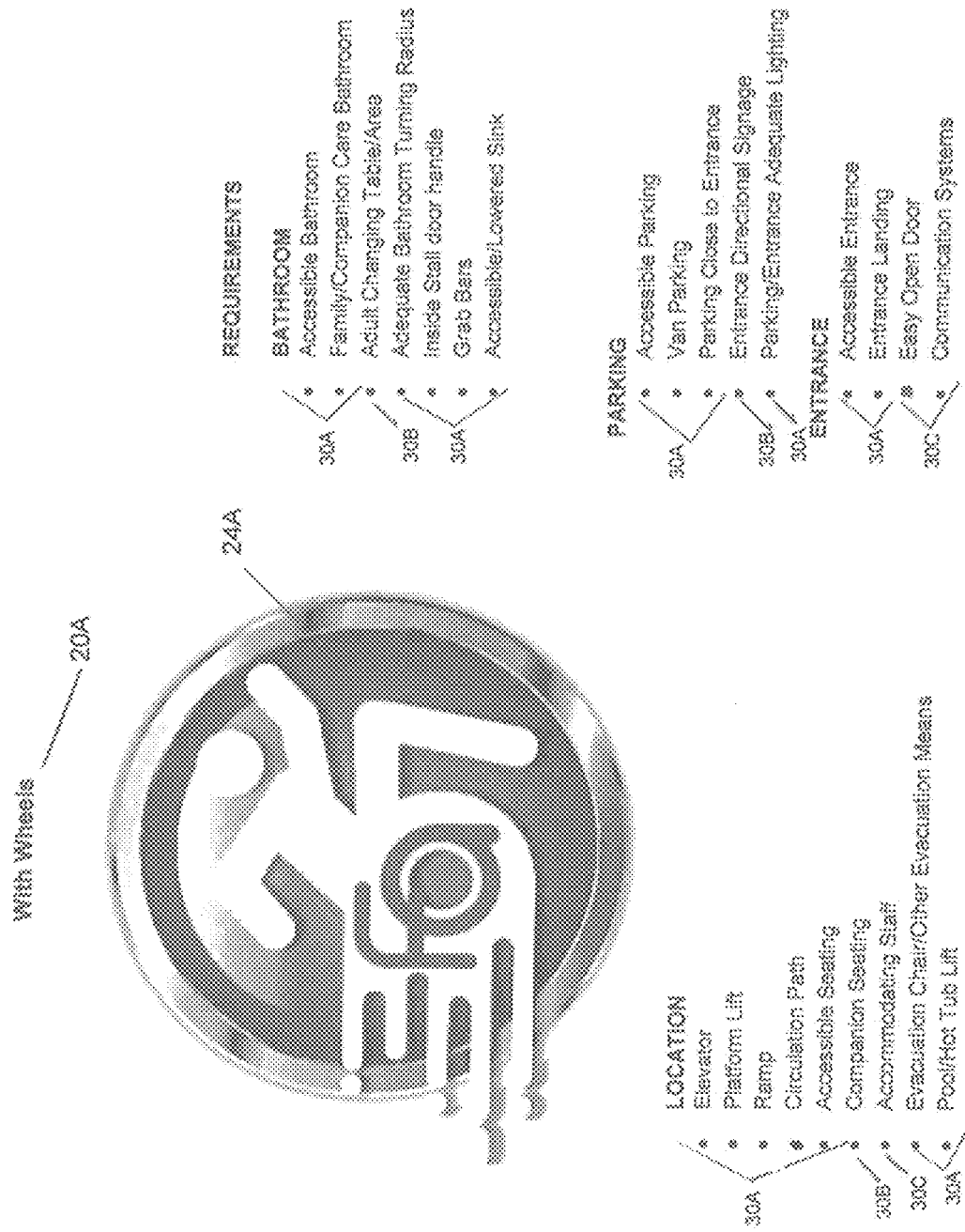
FIG. 4 depicts the features of the with Wheels accessibility category of FIG. 3.
Figure 5:
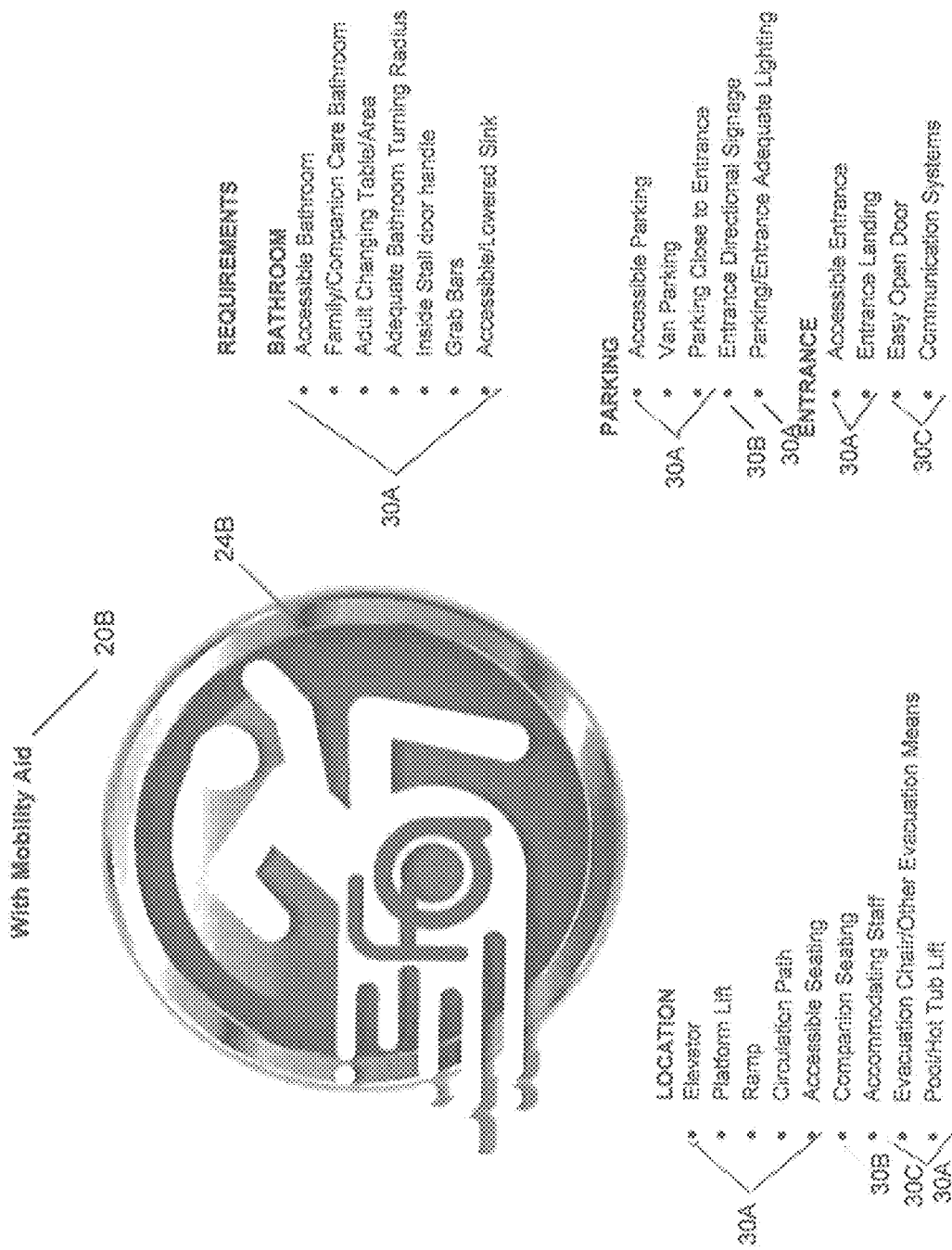
FIG. 5 depicts the features of the with Mobility Aid accessibility category of FIG. 3.
Figure 6:
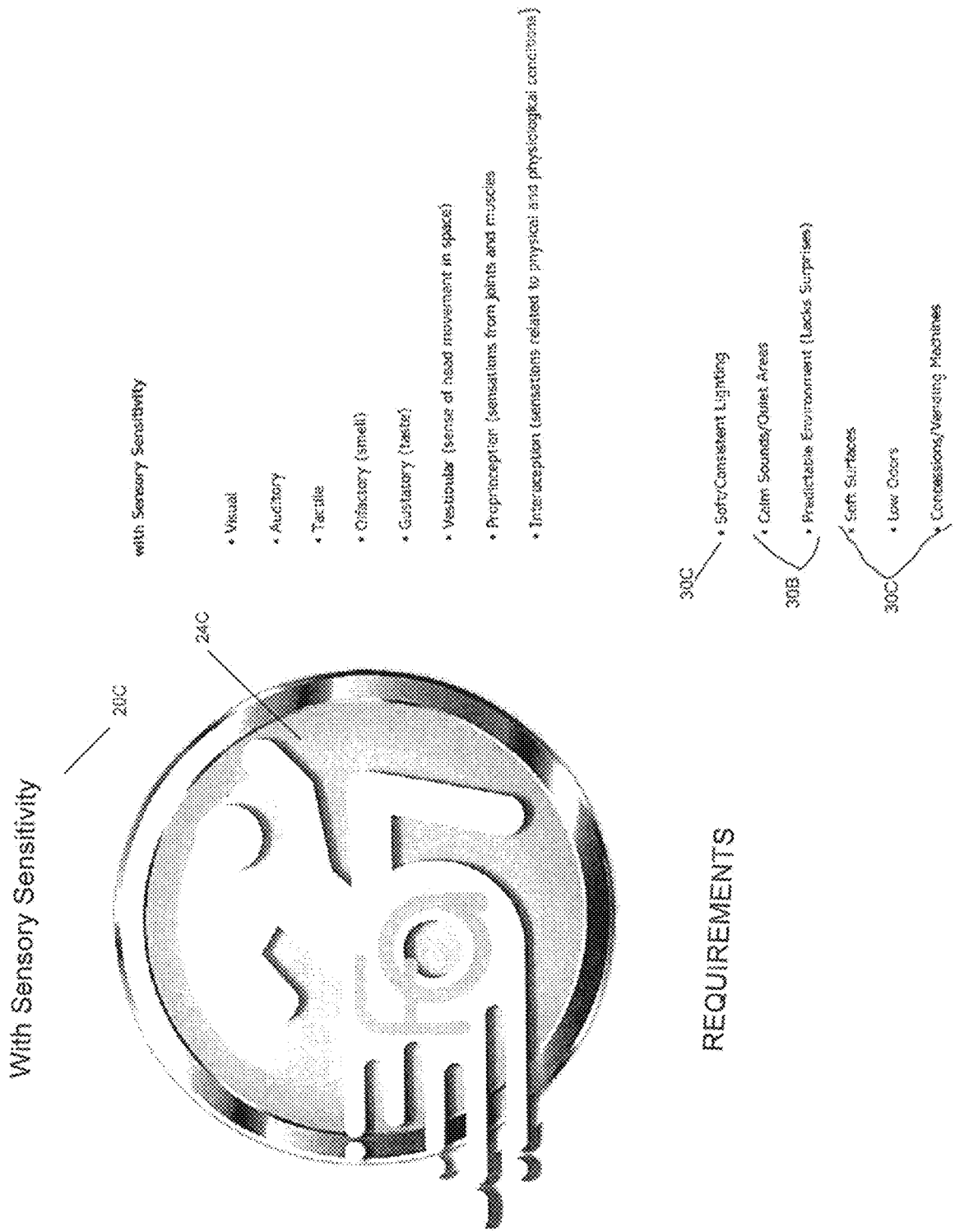
FIG. 6 depicts the features of the with Sensory Sensitivity accessibility category of FIG. 3.
Figure 7:
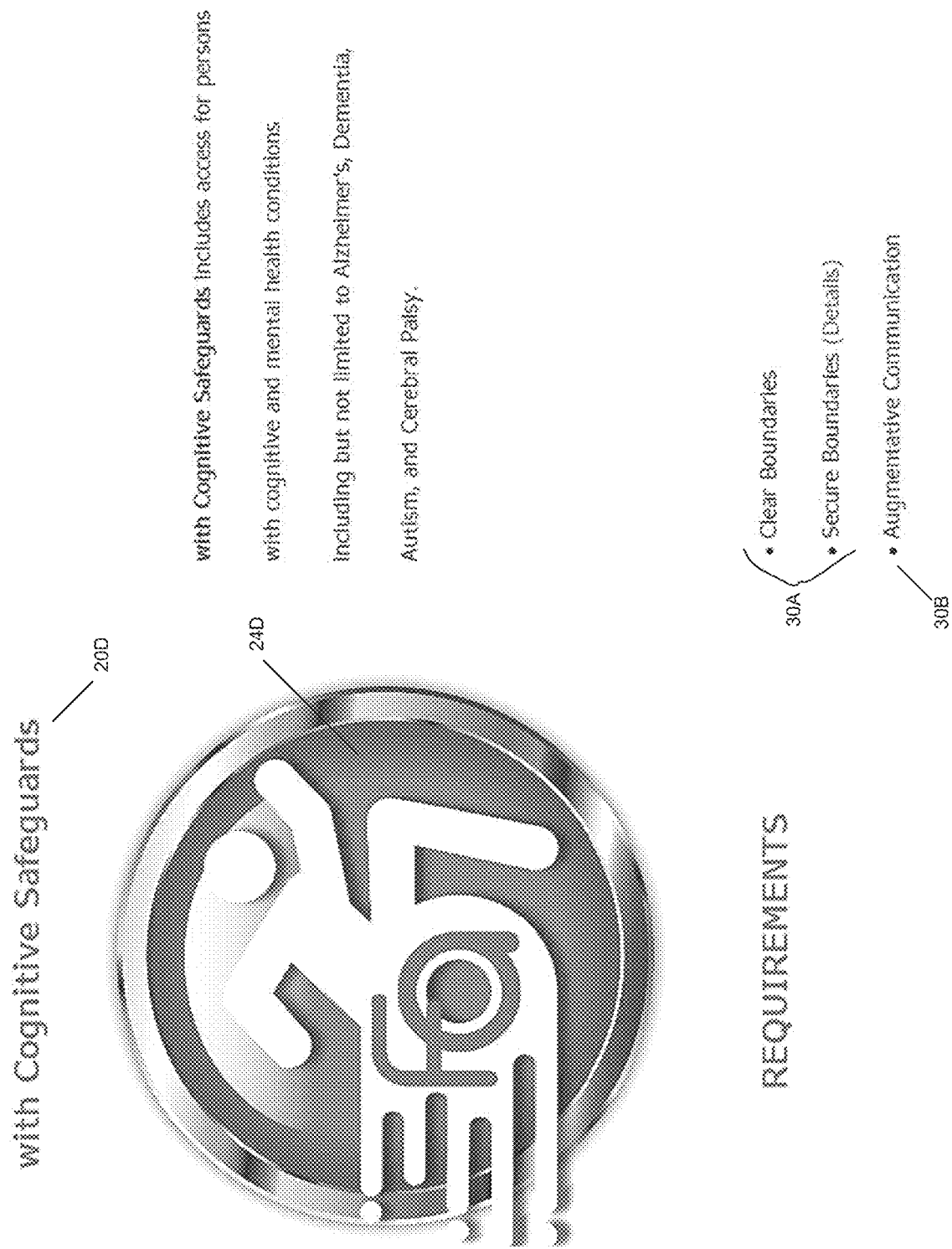
FIG. 7 depicts the features of the with Cognitive Safeguards accessibility category of FIG. 3.
Figure 8:
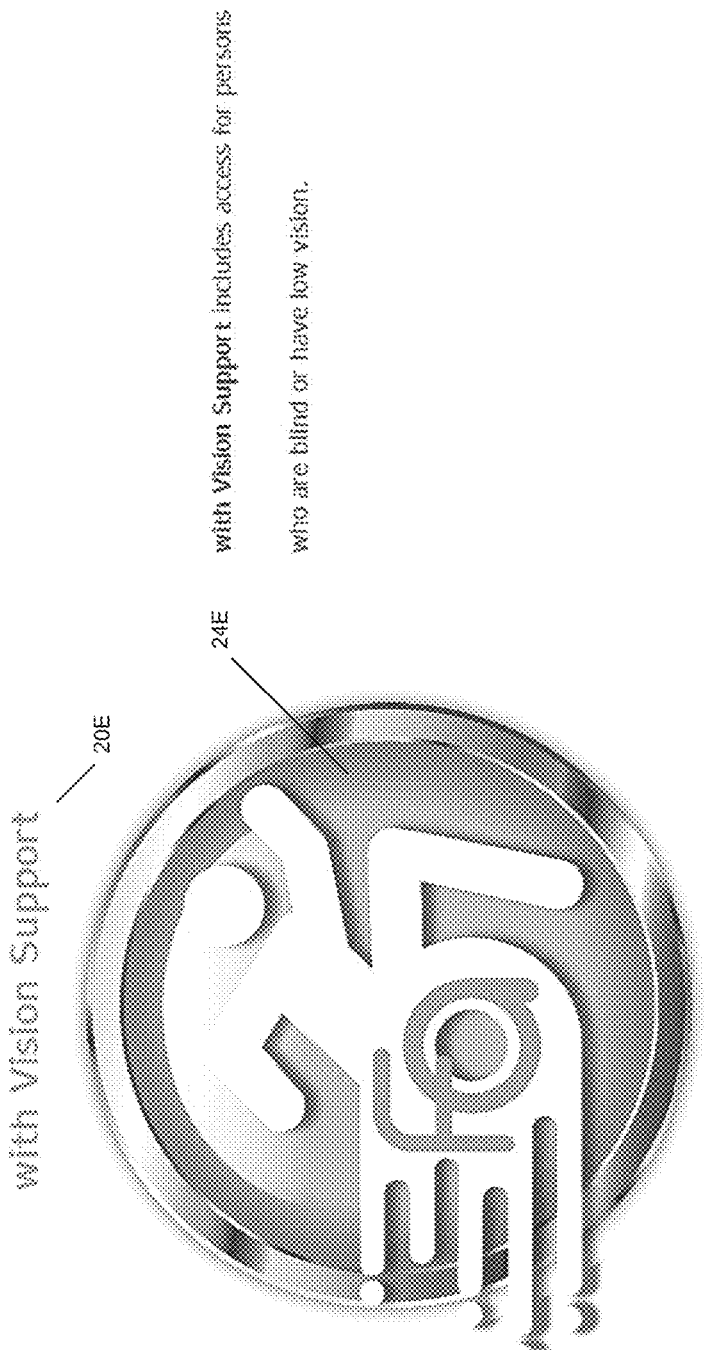
FIG. 8 depicts the features of the with Vision Support accessibility category of FIG. 3.
Figure 9:
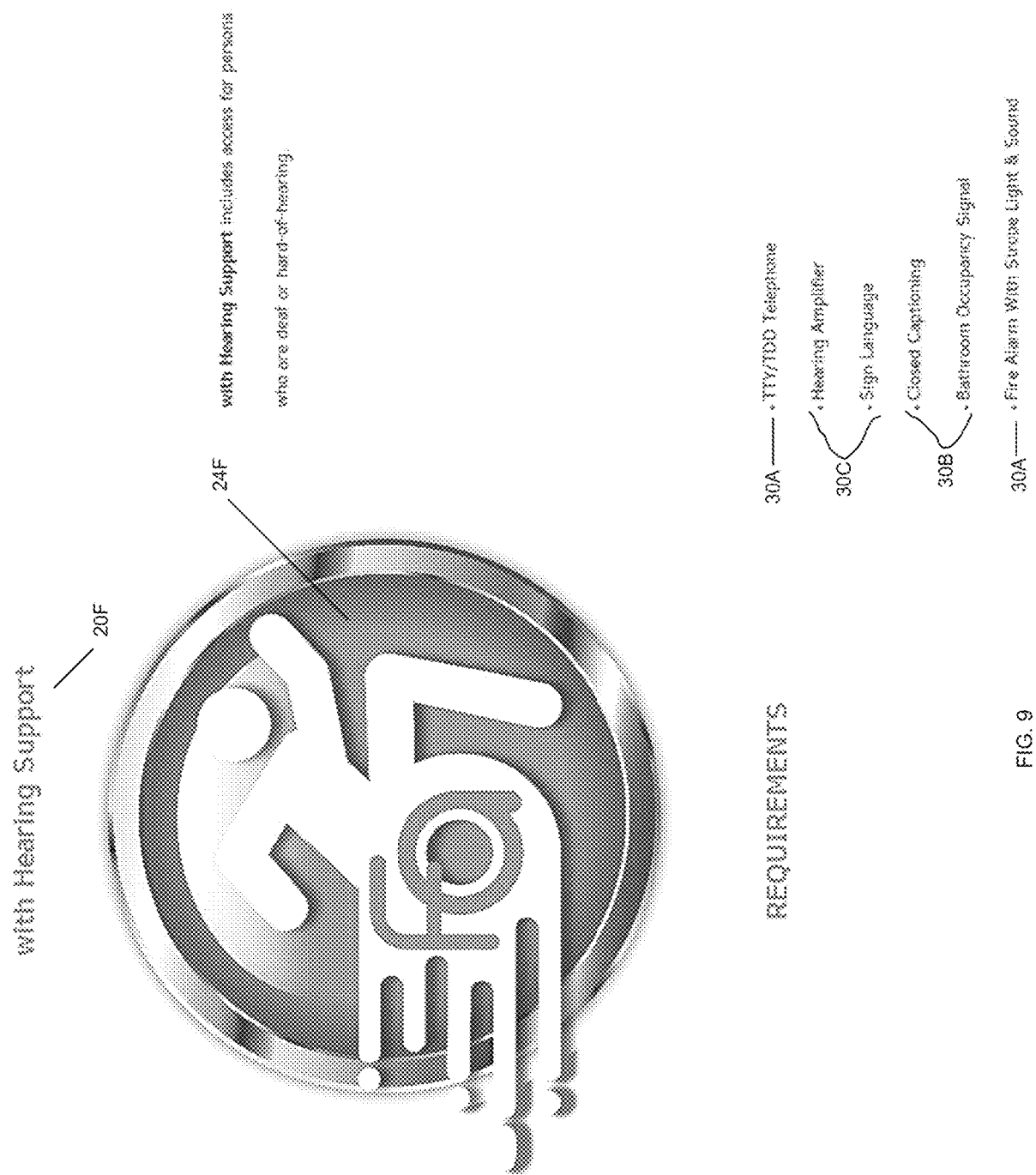
FIG. 9 depicts the features of the with Hearing Support accessibility category of FIG. 3.
Figure 10:
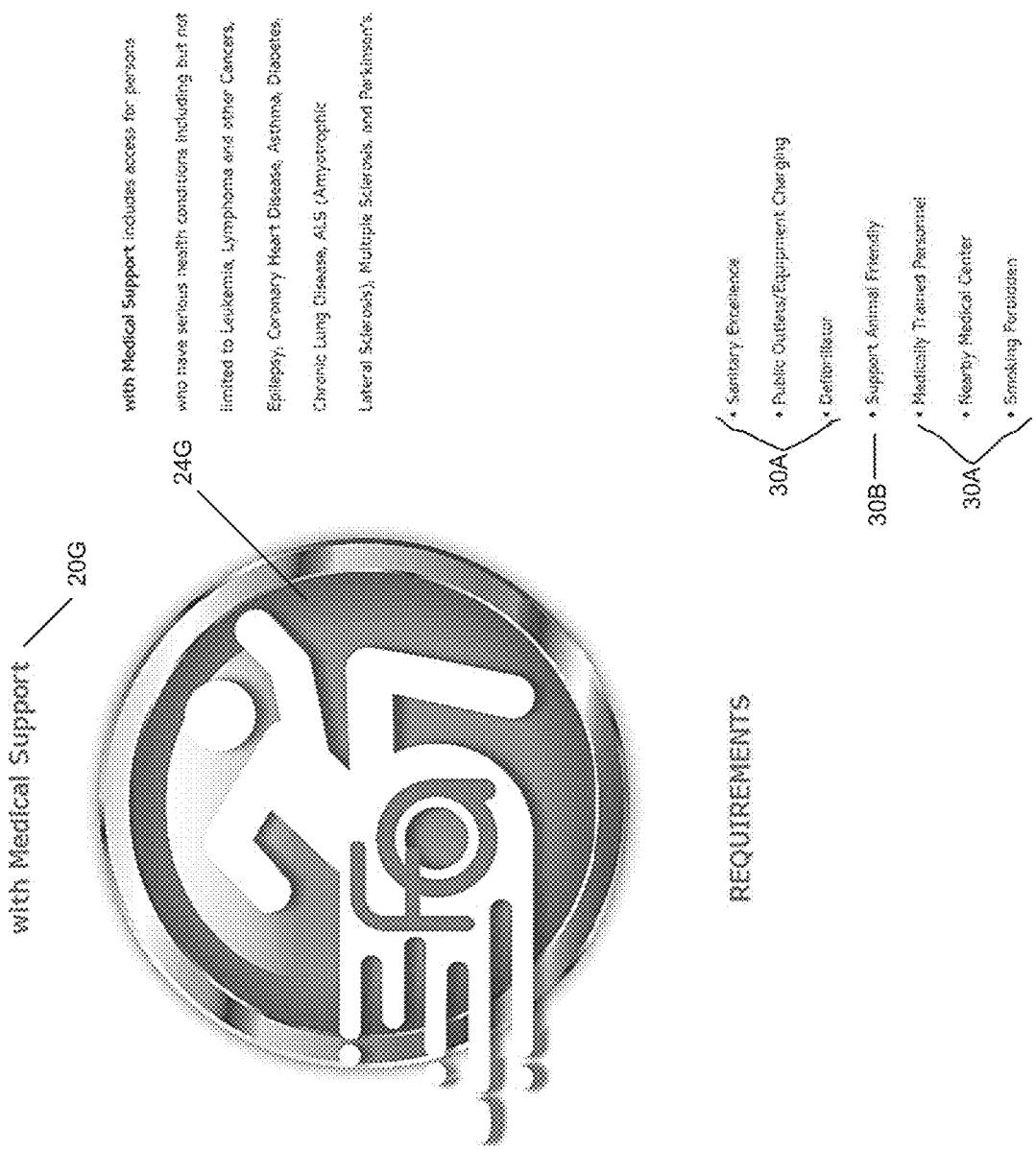
FIG. 10 depicts the features of the with Medical Support accessibility category of FIG. 3.
Figure 11:
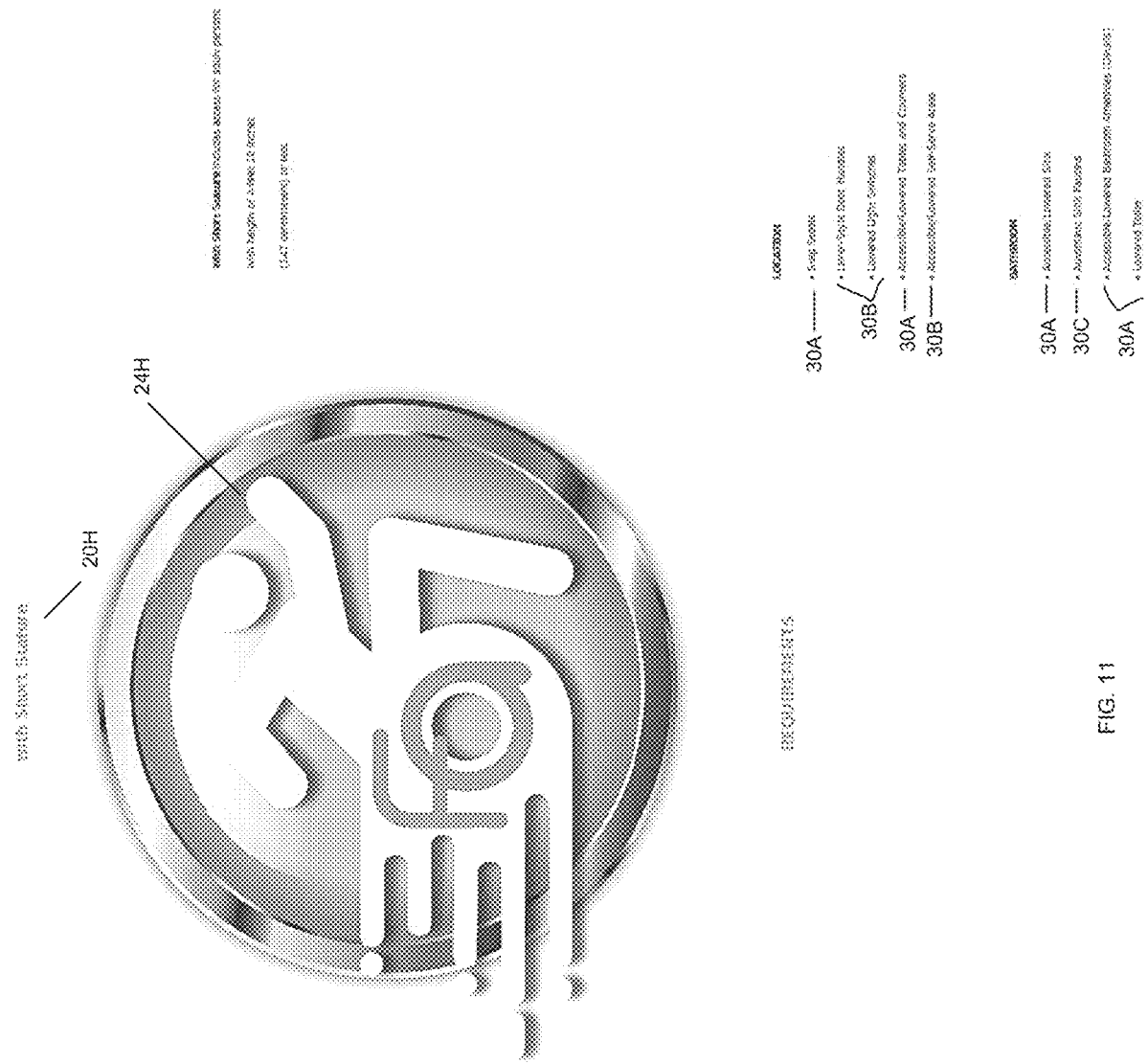
FIG. 11 depicts the features of the with Short Stature accessibility category of FIG. 3.

As shown in FIGS. 1-2B; a system of providing accessibility information to a user and/or member is generally designated by the numeral 10.

Figure 12:
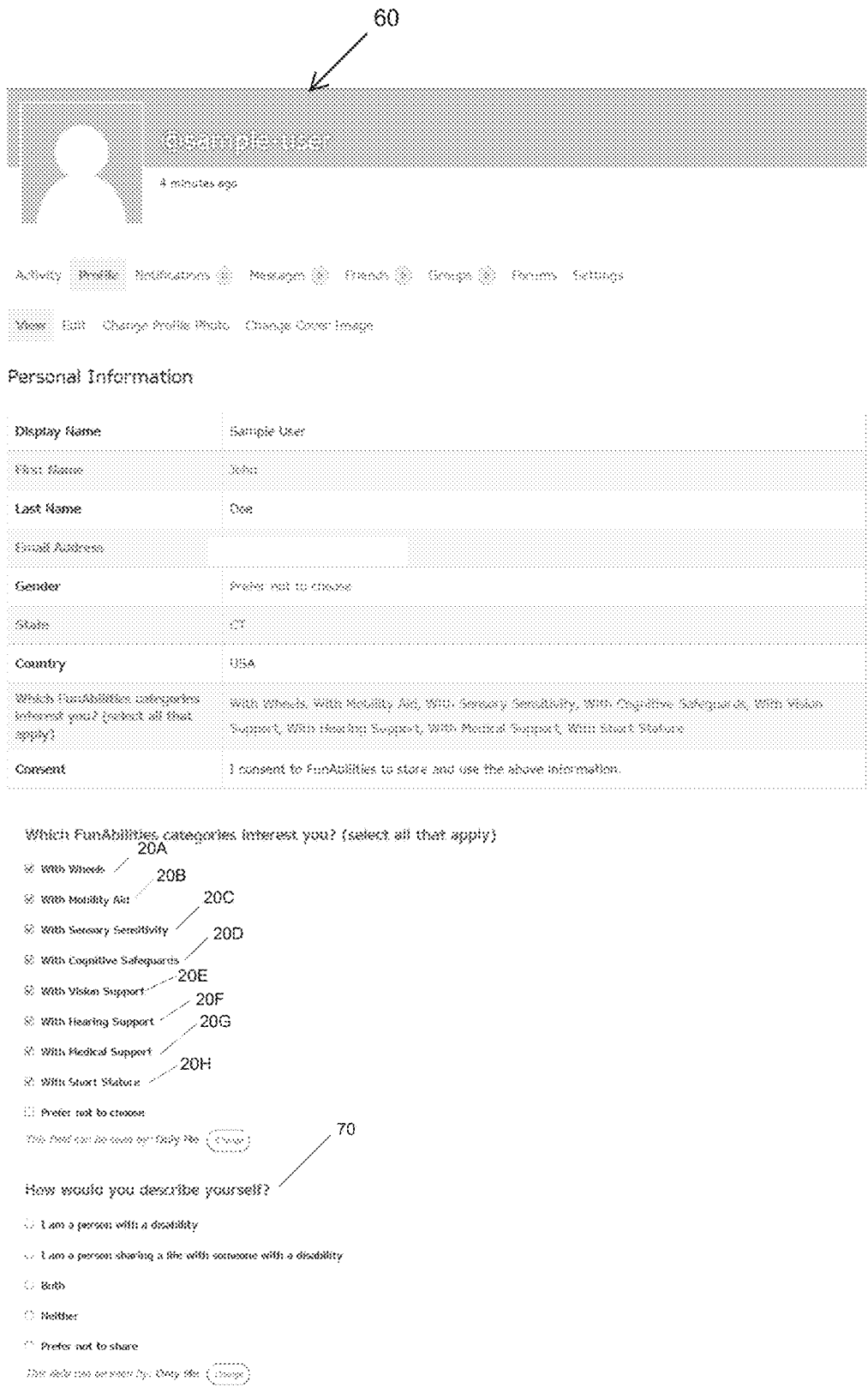
FIG. 12 depicts a member accessibility needs profile compatible with the system of FIG. 1.

The system of providing accessibility information 10 determines a geographic location of a user and/or member based on location information communicated by a user communication device (e.g.; a smart phone, tablet, smart watch, other types of specific accessibility needs devices, a web browser, etc.). The system 10 presents the user and/or member with a number of accessibility categories 20 in a format compatible with the user communication device. In the embodiment depicted in FIGS. 1-2B; the format compatible with the user communication device is a website or mobile application accessible through the Internet that displays on a screen of the user communication device. The format displays the website or app through an Internet browser on the user communication device or within an application dedicated to providing the accessibility information 10. Each of the accessibility categories 20 (depicted in detail in FIGS. 3-11) contains a number of accessibility features 30. The accessibility features 30 are stored in the database. Additional accessibility features 30 within the accessibility categories 20 are suggested by member inputs and may be included in future iterations of the accessibility categories. The system of providing accessibility information 10 receives an input 22 from the member of at least one accessibility category 20A and/or an input 32 of at least one accessibility feature 30A to establish a member needs profile 60 (as depicted in FIG. 12). All users are able to view an overall accessibility rating, category accessibility ratings, and accessibility features present for a plurality of locations. Any user can identify specific accessibility needs and wants each time the engage with the system 10. Users can only create a member needs profile and wants by becoming a member. Members have the ability to create member needs profiles 60. Members also have the ability to indicate the presence of accessibility features 30 for the plurality of locations 40A-40I, to add member comments to the plurality of locations 40A-40I, to participate in groups and forums, to send messages to other members, and to add a new location to the plurality of locations in the database. Businesses that become members can claim their location and, among other things, respond to member comments and provide updates regarding accessibility features provided in their location.

Referring to FIG. 2B, a category accessibility rating 25A is retrieved from a database for each accessibility category 20A-20H for a plurality of locations within the selected geographic zone of the user and/or member. In other words, the system 10 limits the search results to locations within a radius of the current or future location of the user and/or member (e.g., within 1 miles, within 5 miles, etc.). The geographic zone of the user and/or member is based on the current geographic location of the user and/or member or can be selected by the user and/or member to allow for trips to be planned in advance. In the embodiment depicted in FIGS. 1-2B, the user and/or member inputs a geographic zone identifier such as a zip code or a physical address or geo-locating establishes a user and/or member location to establish the geographic zone. An overall accessibility rating 21 is provided based on category accessibility ratings 25A, 25B, 25D of the accessibility categories 20A, 20B, 20D, each of which is determined based on the presence of accessibility features 30 within each of the plurality of locations. The database is accessed by the user communication device through the Internet and the accessibility categories 20 are depicted on a website or presented in an application on the user communication device. In the embodiment depicted in FIGS. 1-2B, selected locations or favorite locations can be saved locally to the user communication device or the member accessibility profile 70 by only by the member (in some cases the favorites are saved to the member accessibility profile 70, as discussed in detail below) to allow access without requiring an active connection to the database through the Internet.

Referring to FIG. 1, the system 10 allows the user and/or member to select an additional accessibility feature 30A' in response to an additional input 34 after displaying each of the plurality of locations 40A-40I to establish a modified search result. The order and the presence of the displayed plurality of locations 10A-40I are updated based the geographic location of the user and/or member and the modified search result.

Referring to FIG. 1, the system 10 displays each of the plurality of locations 40A-40I in an ordered list based on proximity to the geographic zone of the user, the user's chosen category and/or accessibility feature needs, and/or the member needs profile 60. In the embodiment depicted in FIG. 1, the system 10 displays the plurality of locations 40A-40I as large icons with representative pictures of the locations. Each of the displayed locations 40A-40I also contains an address 42A-42I and other important location information such as a phone number, website address, and operating hours, for example. Once the user and/or member selects one of the displayed locations, such as location 40A, the system 10 provides directions to the address 42A from the geographic location of the user and/or member and the location can be saved as a favorite place in the member accessibility needs profile 60. The system 10 is easy to use, in most cases requiring less than three user inputs total the display of the plurality of locations 40A-40I and relevant accessibility information. The design of the system 10 provides the user and/or member with clear information that is easy to access, no matter the accessibility needs of the individual user and/or member. The system 10 minimizes any new behaviors the user and/or member has to learn to promote successful engagement of the individuals and to inspire a coherent positive community that enables individuals with specific accessibility needs.

Referring to FIGS. 2A and 2B, the system 10 receives a member rating in the form of a member rating of the accessibility category 20 and/or the presence of at least one accessibility, feature 30 for one of the plurality of locations 40. If the member provides an accessibility feature 30 not already contained in a list of accessibility features for one of the plurality of locations, then the member inputted accessibility feature 30 will be added to the list of accessibility features. If an accessibility feature 30 is already contained in the list of accessibility features for one of the plurality of locations but the member believes the inclusion to be in error, then the member can indicate that the specific accessibility feature 30 is not present at the one of the plurality of locations in the comments, in an email, or by posting the error on the message board. Further proof in the form of a photograph identifying the specific accessibility feature in question may be provided by another member or by the business owner to rectify the list of accessibility features for that location.

The equations used to determine the category accessibility ratings 20 and the relative weights of the accessibility features 30 incorporated therein change over time based on an aggregate of member inputs. The member provided accessibility ratings for each category, the presence of accessibility features, and the member comments are indicative of the importance of the accessibility features 30 and the prevalence or expectation of encountering the accessibility, features 30 within each accessibility category 20 in a plurality of locations 40. The equations weigh specific accessibility features 30 higher than others within a single accessibility category 20.

In one embodiment, the system 10 incorporates an algorithm to generate the category accessibility rating 25 of each accessibility category 20 based on the number of accessibility features 30 indicated by members. An algorithm determines the overall accessibility rating 21 based on each of the category accessibility ratings 25. The member inputs of the accessibility features are assigned a member a voting power $v_i$ based on the total number of accessibility features 30 included in the member rating within the accessibility category 20 and/or the total number of accessibility categories 20 evaluated overall. In other words, if an accessibility category 20 has ten accessibility features 30, then a member who evaluates all ten accessibility features 30 would have a voting power $v_i$ of ten. The certification algorithm can be expressed as follows:

$$\sum_{i=1}^{n} v_i w_i \Big/ \sum_{i=1}^{n} v_i$$

The category accessibility rating $w_i$ is expressed as a numeric decimal and n is the number of distinct people who have reviewed a location. The category accessibility ratings are calculated based on an equation that evaluates the presence and importance of each accessibility feature within each accessibility category, as set forth above. For example, if two people review the with Wheels accessibility category 20A of a single location 40A, the first person reviewed ten accessibility features in the with Wheels accessibility category 20A and the category accessibility rating 25A based on the accessibility features entered by the member resulted in a category accessibility rating of 80%, and the second person reviewed only one accessibility feature in the with Wheels accessibility category 20A and inputted a single accessibility feature resulting in a category accessibility rating 25A of 20%, then the algorithm provides a category accessibility rating 25A of the with Wheels accessibility category of:

$$\frac{(10 \times 0.8) + (1 \times 0.2)}{10 + 1} \cong 0.745.$$

If the member gives a rating of zero, then the voting power $v_i$ is zero and the category accessibility rating 25A is unaffected.

Referring to FIGS. 1 and 2A, the system 10 also includes a location identifier 50 designating a place, a service, or an event. Each of the displayed locations 40A-40I has a location identifier designation 50A-50I (in the embodiment depicted in FIGS. 1 and 2A each location identifier designation 50A-50I is a place). The location identifier 52 designates a type of place, a type of service, or a type of event. The location identifier 52 includes, but is not limited to, active life, arts and entertainment, beauty and spas, education, event planning and services, financial planning, food, health and medical, home services, hotels and travel, local flavor, local services, mass media, nightlife, pets, professional services, public services and government, real estate, religious organizations, restaurants, and shopping.

Referring to FIG. 12, the member accessibility needs profile 60 is stored within the database, a website, or on an application connected to a user communication device. At least one accessibility category 20A-20H and/or accessibility feature is chosen. A geographic zone 54 (depicted in FIG. 1) is selected by the user and/or member. The geographic zone can surround the current or future geographic location of the user and/or member. The member accessibility needs profile 60 provides the requisite information to the system 10, as set forth above, to evaluate the database of accessibility categories 20A-20H of a plurality of locations within the geographic zone 54. In some embodiments, the member accessibility needs profile 60 contains a title 70. In the depicted embodiment, the title 70 identifies whether the member is the individual with the disability and/or the member shares a life with someone with a disability. The title 70 also allows the member to configure and/or link multiple member accessibility sub-profiles (not depicted) within a single member login. These multiple sub-profiles allow a single member to store multiple member accessibility needs profiles for themselves and/or others with different specific accessibility needs.

The accessibility categories 20 depicted in FIG. 1 (and depicted in detail in FIGS. 3-11, respectively) include with Wheels 20A, with Mobility Aid 20B, with Sensory Sensitivity 20C, with Cognitive Support 20D, with Vision Support 20E, with Hearing Support 20F, with Medical Support 20G, and with Short Stature 20H.

The accessibility features 30 of each accessibility category 20 qualify as safety features 30A, dignity features 30B, or comfort features 30C. This hierarchy is included in the weighted algorithm for determining the category accessibility ratings and the overall accessibility rating, as set forth above. In the embodiment depicted in FIG. 1, the accessibility rating gives greater weight to safety features 30A than dignity features 30B, and gives greater weight to dignity features 30B than comfort features 30C. The safety features 30A are integral features that are necessary and must be physically present to accommodate an individual with specific accessibility needs. These integral and necessary features are weighed most heavily in the accessibility rating 25 of each accessibility category 20 because they are physically required by the individual with specific accessibility needs. The dignity features 30B, though not essential, are preferred features that allow the individuals with specific accessibility needs to more easily enter and exit the location, use the bathroom at the location, or do any other task specific to the location. The dignity features 30B are not essential or not required for the individual with specific accessibility needs to successfully attend the location, but they are preferred considerations and can significantly factor into the individual's choice for visiting the location. The dignity features 30B can be the determining feature for some individuals with specific accessibility needs. Comfort features 30C are features that may or can be relevant to the individual with specific accessibility needs but are not required for attendance at the location. The comfort features 30C are optional features that in some cases make attendance at the location easier or otherwise more comfortable for the individual with specific accessibility needs. The system 10 disclosed herein and the adjustable equations for the accessibility ratings 25 factor in the relative weight of the three groups of accessibility features 30A, 30B, 30C, in addition to adjusting the weights of the accessibility features within each group, to arrive at accessibility ratings 25 for each category 20 that is an accurate representation of necessary, beneficial, and optional features that are relevant to the member with specific accessibility needs.

Referring to FIGS. 3-11, the safety features 30A include, but are not limited to: bathroom accessibility, entrance accessibility, parking accessibility, seating accessibility, bathroom amenities being accessible or lowered, sinks being accessible or lowered, tables and counters being accessible or lowered, providing an adequate bathroom turning radius, braille availability, providing a braille keypad or a phone with large buttons, adequate circulation paths, clear boundaries, providing a defibrillator, providing an elevator, providing an entrance landing, providing an evacuation chair or other evacuation means, posting an evacuation plan, providing a family or companion care bathroom, providing a fire alarm with a strobe light and sound, providing grab bars, providing a door handle inside a bathroom stall, providing a lifeguard, providing a lowered toilet, providing medically trained personnel, providing a nearby medical center, providing parking close to an entrance, providing adequate lighting for parking and an entrance, providing a platform lift, providing a hoist for a pool or hot tub, providing public outlets for charging (for medical equipment such as oxygen tanks, electric wheelchairs, etc.), providing a ramp, sanitary excellence, providing secure boundaries, forbidding smoking, providing a stair lift, providing handrails for stairs, providing step stools, providing tactile markers, providing a TTY or TDD telephone, providing protection from under sink pipes (to prevent contact between the member and scalding or excessively hot pipes and/or fluids), and providing van parking.

Referring to FIGS. 3-11, the dignity features 30B include, but are not limited to: providing accessible or lowered self-serve areas, providing an adult changing table and area, providing augmentative communication, providing a bathroom occupancy signal, providing calm sounds and quiet areas, providing closed captioning, providing an easy open door, providing entrance directional signage, large print availability, providing lowered light switches, providing a predictable environment, providing staff trained with ADA sensitivities, and being support animal friendly.

Referring to FIGS. 3-11, the comfort features 30C include, but are not limited to: accommodating staff, providing an automated door, providing automatic sink faucets, booth seating arrangements, providing a communication system, companion seating arrangements, providing concessions and/or vending machines, providing a hearing amplifier, providing hooks, providing shelves, providing baskets, providing lever-style door handles, low odors, the location being one level or a single story, sign language, providing soft surfaces, and providing soft and consistent lighting Referring to FIGS. 3-11, the system 10 awards an accessibility certification in each category 24A-24H if the accessibility rating of the respective accessibility category of one of the plurality of locations is above a predetermined threshold. In the embodiment depicted in FIGS. 1-11, the accessibility certification 24A-24H is for any accessibility ratings greater than 0.8 or 80%. The accessibility certification displays a full or partial colored icon or star associated with the accessibility category. In one embodiment (not depicted) category accessibility certifications and/or an overall accessibility certification are awarded based on member feedback in the form of comments, emails, and/or posts to the message board.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. A method of providing a member with accessibility information, the method comprising:
determining a geographic zone based on at least one of a geographic location of the member and a selected geographic location, a user communication device communicating the geographic location of the member, and the member inputting a geographic zone identifier to establish the selected geographic location;
establishing a member needs profile based on the member inputting at least one of an accessibility category or an accessibility feature in a format compatible with the user communication device;
retrieving, from a database, a list of a plurality of locations within the geographic zone based on the member needs profile, each of the plurality of locations comprising a list of plurality of accessibility categories, each of the plurality of accessibility categories comprising a list of a plurality of accessibility features;
retrieving, from the database, a category accessibility rating for each of the plurality of accessibility categories, each category accessibility rating is based on a weighted algorithm comprising a calculation of a likelihood that each of the respective plurality of accessibility features are physically present at the respective location;
retrieving, from the databases, an overall accessibility rating for each of the plurality of locations, each of the overall accessibility ratings is based on the respective category accessibility ratings of the respective location;

displaying, on a screen contained in the user communication device, the list of the plurality of locations with the respective lists of the plurality of accessibility categories, the respective lists of the plurality of accessibility features, the respective overall accessibility ratings, and the respective category accessibility ratings displayed in an order based on at least one of the geographic zone or the member needs profile:

receiving, from one of the member or another member, a member review of one of the plurality of locations, the member review comprising an indication that at least one of the plurality of accessibility features is physically present or is not physically present at the one of the plurality of locations; and recalculating the category accessibility ratings and the overall accessibility rating of the one of the plurality of locations based on the member review;

wherein the list of the plurality of accessibility categories comprises with Wheels, with Mobility Aid, with Sensory Sensitivity, with Cognitive Support, with Vision Support, with Hearing Support, with Medical Support, and with Short Stature.

2. The method of claim 1, further comprising:

receiving a second input from the member through the user communication device of at least one of an accessibility category and an accessibility feature after the step of displaying each of the plurality of locations to establish a modified search result; and displaying each of the plurality of locations on the screen of the user communication device in an updated order based on at least one of the geographic zone and the modified search result.

3. The method of claim 1, wherein the accessibility features comprise safety features, dignity features, or comfort features, and wherein the accessibility rating weighs safety features heavier than dignity features and weighs dignity features heavier than comfort features.

4. The method of claim 3, wherein the safety features comprise:

at least one of bathroom accessibility, entrance accessibility, parking accessibility, seating accessibility, bathroom amenities being accessible or lowered, sinks being accessible or lowered, tables and counters being accessible or lowered, providing an adequate bathroom turning radius, braille availability, providing a braille keypad or a phone with large buttons, adequate circulation paths, clear boundaries, providing a defibrillator, providing an elevator, providing an entrance landing, providing an evacuation chair or other evacuation means, posting an evacuation plan, providing a family or companion care bathroom, providing a fire alarm with a strobe light and sound, providing grab bars, providing a door handle inside a bathroom stall, providing a lifeguard, providing a lowered toilet, providing medically trained personnel, providing a nearby medical center, providing parking close to an entrance, providing adequate lighting for parking and an entrance, providing a platform lift, providing a hoist for a pool or hot tub, providing public outlets for charging, providing a ramp, sanitary excellence, providing secure boundaries, forbidding smoking, providing a stair lift, providing handrails for stairs, providing step stools, providing tactile markers, providing a TTY or TDD telephone, protection from under sink pipes, and providing van parking.

5. The method of claim 3, wherein the dignity features comprise:

at least one of providing accessible or lowered self-serve areas, providing an adult changing table and area, providing augmentative communication, providing a bathroom occupancy signal, providing calm sounds and quiet areas, providing closed captioning, providing an easy open door, providing entrance directional signage, large print availability, providing lowered light switches, providing a predictable environment, providing staff trained with the Americans with Disabilities Act ("ADA") sensitivities, and being support animal friendly.

6. The method of claim 3, wherein the comfort features comprise:

at least one of accommodating staff, providing an automated door, providing automatic sink faucets, booth seating arrangements, providing a communication system, companion seating arrangements, providing concessions or vending machines, providing a hearing amplifier, providing hooks, providing shelves, providing baskets, providing lever-style door handles, low odors, the location being one level or a single story, sign language, providing soft surfaces, and providing soft and consistent lighting.

7. The method of claim 1, wherein the database is accessed by the user communication device through the Internet and the format compatible with the user communication device is a website or an application that communicates with the database through the Internet.

8. The method of claim 1, further comprising:

receiving a chosen one of the plurality of locations from the user communication device after displaying each of the plurality of locations; and providing directions on the screen of the user communication device from the geographic location of the member to the chosen one of the plurality of locations.

9. The method of claim 1, further comprising:

receiving a chosen one of the plurality of locations from the user communication device after displaying each of the plurality of locations; and storing the chosen one of the plurality of locations in the user communication device as a favorite location.

10. The method of claim 1, wherein the member needs profile further comprises a location identifier designating a place, a service, an event, a type of place, a type of service, or a type of event.

11. A method of providing a member with accessibility information, the method comprising:

determining a geographic zone based on at least one of a geographic location of the member and a selected geographic location, a user communication device communicating the geographic location of the member, and the member inputting a geographic zone identifier to establish the selected geographic location;

establishing a member needs profile based on the member inputting at least one of an accessibility category or an accessibility feature in a format compatible with the user communication device;

retrieving, from a database, a list of a plurality of locations within the geographic zone based on the member needs profile, each of the plurality of locations comprising a list of a plurality of accessibility categories, each of the plurality of accessibility categories comprising a list of a plurality of accessibility features;

retrieving, from the database, a category accessibility rating for each of the plurality of accessibility categories, each category accessibility rating is based on a weighted algorithm comprising a calculation of a likelihood that each of the respective plurality of accessibility features are physically present at the respective location;

retrieving, from the database, an overall accessibility rating for each of the plurality of locations, each of the overall accessibility ratings is based on the respective category accessibility ratings of the respective location;

displaying, on a screen contained in the user communication device, the list of the plurality of locations with the respective lists of the plurality of accessibility categories, the respective lists of the plurality of accessibility features, the respective overall accessibility ratings, and the respective category accessibility ratings displayed in an order based on at least one of the geographic zone or the member needs profile;

receiving a member review of one of the plurality of locations generated from one of the member or another member, the member review comprising an indication that at least one of the plurality of accessibility features is physically present or is not physically present at the one of the plurality of locations, wherein the one of the member or another member physically visits the one of the plurality of locations prior to generating the member review; and recalculating the category accessibility ratings and the overall accessibility rating of the one of the plurality of locations based on the member review;

wherein the list of the plurality of accessibility categories comprises with Wheels, with Mobility Aid, with Sensory Sensitivity, with Cognitive Support, with Vision Support, with Hearing Support, with Medical Support, and with Short Stature.

12. The method of claim 11, further comprising:
receiving a second input from the member through the user communication device of at least one of an accessibility category and an accessibility feature after the step of displaying each of the plurality of locations to establish a modified search result; and
displaying each of the plurality of locations on the screen of the user communication device in an updated order based on at least one of the geographic zone and the modified search result.

13. The method of claim 11, wherein the accessibility features comprise safety features, dignity features, or comfort features, and wherein the accessibility rating weighs safety features heavier than dignity features and weighs dignity features heavier than comfort features.

14. The method of claim 13, wherein the safety features comprise:
at least one of bathroom accessibility, entrance accessibility, parking accessibility, seating accessibility, bathroom amenities being accessible or lowered, sinks being accessible or lowered, tables and counters being accessible or lowered, providing an adequate bathroom turning radius, braille availability, providing a braille keypad or a phone with large buttons, adequate circulation paths, clear boundaries, providing a defibrillator, providing an elevator, providing an entrance landing, providing an evacuation chair or other evacuation means, posting an evacuation plan, providing a family or companion care bathroom, providing a fire alarm with a strobe light and sound, providing grab bars, providing a door handle inside a bathroom stall, providing a lifeguard, providing a lowered toilet, providing medically trained personnel, providing a nearby medical center, providing parking close to an entrance, providing adequate lighting for parking and an entrance, providing a platform lift, providing a hoist for a pool or hot tub, providing public outlets for charging, providing a ramp, sanitary excellence, providing secure boundaries, forbidding smoking, providing a stair lift, providing handrails for stairs, providing step stools, providing tactile markers, providing a TTY or TDD telephone, protection from under sink pipes, and providing van parking.

15. The method of claim 13, wherein the dignity features comprise:
at least one of providing accessible or lowered self-serve areas, providing an adult changing table and area, providing augmentative communication, providing a bathroom occupancy signal, providing calm sounds and quiet areas, providing closed captioning, providing an easy open door, providing entrance directional signage, large print availability, providing lowered light switches, providing a predictable environment, providing staff trained with the Americans with Disabilities Act ("ADA") sensitivities, and being support animal friendly.

16. The method of claim 13, wherein the comfort features comprise:
at least one of accommodating staff, providing an automated door, providing automatic sink faucets, booth seating arrangements, providing a communication system, companion seating arrangements, providing concessions or vending machines, providing a hearing amplifier, providing hooks, providing shelves, providing baskets, providing lever-style door handles, low odors, the location being one level or a single story, sign language, providing soft surfaces, and providing soft and consistent lighting.

17. The method of claim 11, wherein the database is accessed by the user communication device through the Internet and the format compatible with the user communication device is a website or an application that communicates with the database through the Internet.

18. The method of claim 11, further comprising:
receiving a chosen one of the plurality of locations from the user communication device after displaying each of the plurality of locations; and
providing directions on the screen of the user communication device from the geographic location of the member to the chosen one of the plurality of locations.

19. The method of claim 11, further comprising:
receiving a chosen one of the plurality of locations from the user communication device after displaying each of the plurality of locations; and
storing the chosen one of the plurality of locations in the user communication device as a favorite location.

20. The method of claim 11, wherein the member needs profile further comprises a location identifier designating a place, a service, an event, a type of place, a type of service, or a type of event.

* * * * *